United States Patent
Mateo Delgado et al.

(10) Patent No.: US 8,725,640 B2
(45) Date of Patent: May 13, 2014

(54) METHOD FOR THE WITHDRAWAL OF FUNDS AT CASH DISPENSERS WITHOUT A CARD, BY MEANS OF A PAYMENT ORDER VIA SMS

(75) Inventors: Aurora Mateo Delgado, Madrid (ES); Pilar Fernandez Hermosilla, Madrid (ES); Juan Pérez Gómez, Coruña (ES)

(73) Assignees: Bankinter (ES); Caixa Galicia. (ES)

( * ) Notice: Subject to any disclaimer, the term of this patent is extended or adjusted under 35 U.S.C. 154(b) by 1168 days.

(21) Appl. No.: 11/571,682

(22) PCT Filed: Jul. 5, 2004

(86) PCT No.: PCT/ES2004/000321
§ 371 (c)(1),
(2), (4) Date: Oct. 15, 2009

(87) PCT Pub. No.: WO2006/013218
PCT Pub. Date: Feb. 9, 2006

(65) Prior Publication Data
US 2010/0042543 A1    Feb. 18, 2010

(51) Int. Cl.
*G06Q 40/00*    (2012.01)
(52) U.S. Cl.
USPC ............................................. 705/43; 705/37
(58) Field of Classification Search
USPC ..................................................... 705/35–45
See application file for complete search history.

(56) References Cited

U.S. PATENT DOCUMENTS

| | | |
|---|---|---|
| 5,650,604 A | 7/1997 | Marcous et al. |
| 5,963,647 A | 10/1999 | Downing et al. |
| 6,078,908 A | 6/2000 | Schmitz |

(Continued)

FOREIGN PATENT DOCUMENTS

| | | |
|---|---|---|
| DE | 197 18 103 | 6/1998 |
| GB | 2 379 040 | 2/2003 |
| GB | 2 379 525 | 3/2003 |

(Continued)

OTHER PUBLICATIONS

European Communication pursuant to Article 94(3) EPC dated Jul. 16, 2010, from corresponding European Application No. 04 742 050.0.
International Search Report dated Nov. 19, 2004, from corresponding International Application No. PCT/ES2004/000321.

*Primary Examiner* — Robert R Niquette
*Assistant Examiner* — Chia Yi Liu
(74) *Attorney, Agent, or Firm* — Jeffrey M. Furr, Esq.; Furr Law Firm

(57) ABSTRACT

A method is described for the withdrawal of cash at automatic telling machines in which the beneficiary of the payment does not have to make use of a card, account or any other instrument in order to obtain cash, and without the need for any transfer of funds to take place. The method envisages that cash should be withdrawn by means of a payment order via SMS, permitting a principal to use a mobile telephone to order the payment of a certain amount of money to a third party, who, thanks to the information received at his mobile telephone, may withdraw that amount from any cash dispenser enabled for the purpose, having as a means of security an exclusive code or PIN for each operation known only by the principal and the beneficiary. The method of payment via SMS contemplated by the invention is especially applicable to the existing network of cash dispensers and services.

16 Claims, 2 Drawing Sheets

(56) References Cited

U.S. PATENT DOCUMENTS

Figure 1:
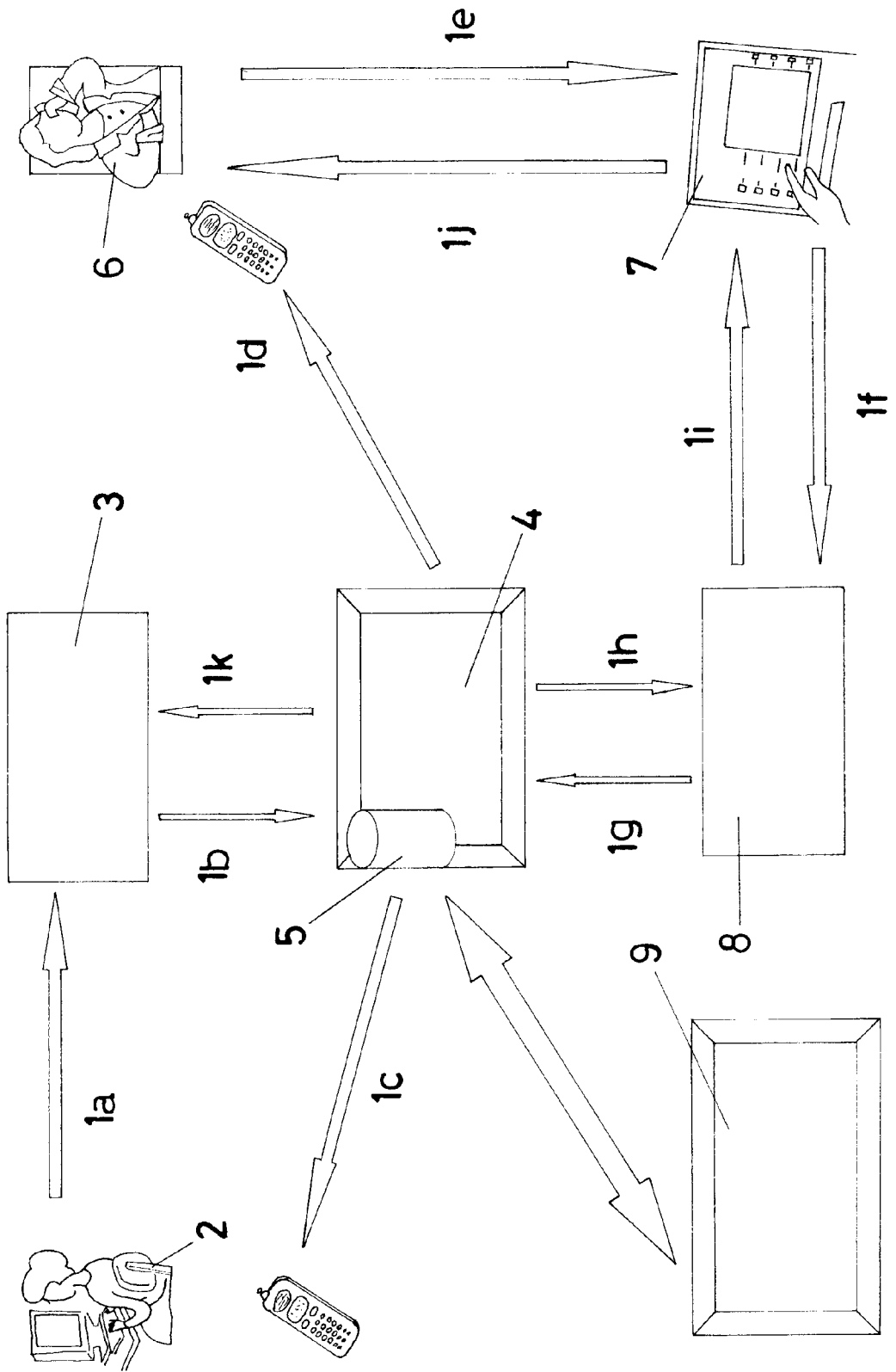

| | | | |
|---|---|---|---|
| 6,081,791 A * | 6/2000 | Clark | 705/43 |
| 6,304,860 B1 * | 10/2001 | Martin et al. | 705/43 |
| 6,317,745 B1 * | 11/2001 | Thomas et al. | 1/1 |
| 7,070,094 B2 * | 7/2006 | Stoutenburg et al. | 235/379 |
| 2002/0062285 A1 * | 5/2002 | Amann et al. | 705/43 |
| 2002/0069170 A1 * | 6/2002 | Rizzo et al. | 705/43 |
| 2003/0126083 A1 * | 7/2003 | Seifert et al. | 705/43 |
| 2004/0024696 A1 * | 2/2004 | Alves | 705/39 |

FOREIGN PATENT DOCUMENTS

| | | | |
|---|---|---|---|
| GB | 2379525 A * | 3/2003 | |
| JP | 11-039538 | 2/1999 | |
| JP | 2003-123126 | 4/2003 | |
| WO | 00/22494 | 4/2000 | |
| WO | 02/41271 | 5/2002 | |

* cited by examiner

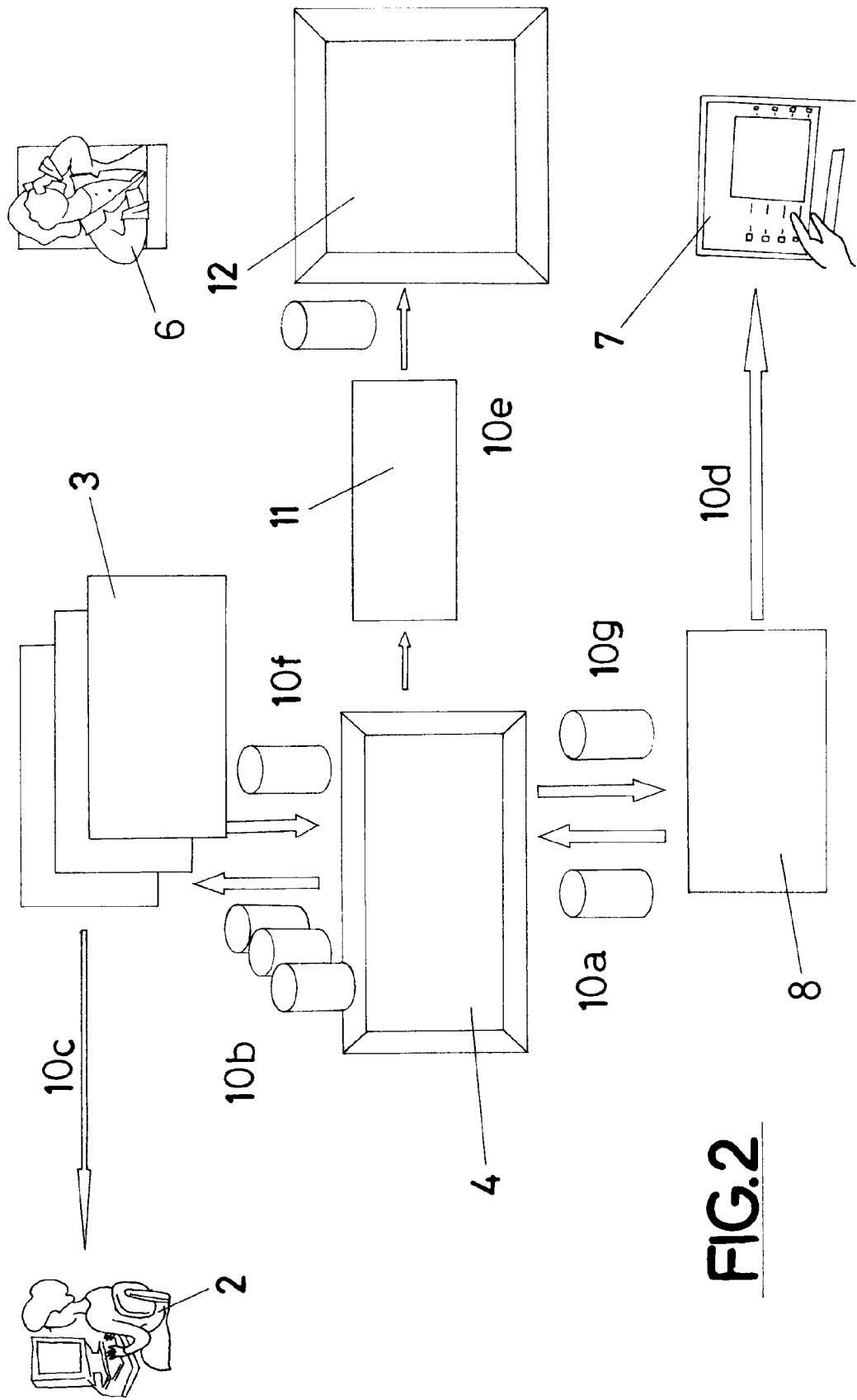

METHOD FOR THE WITHDRAWAL OF FUNDS AT CASH DISPENSERS WITHOUT A CARD, BY MEANS OF A PAYMENT ORDER VIA SMS

OBJECT OF THE INVENTION

The present invention refers to a method for the withdrawal of funds at cash dispensers without a card, by means of a payment order via SMS, which contributes essential features of novelty and considerable advantages over the known means used for the ends in the present state of the art.

More specifically, the aim of the invention is to develop a package of modules required to make it possible to carry out the operation of withdrawing cash from automatic telling machines securely without the need to have any card whatsoever, by means of the use of a payment order via SMS, using a network of ATMs of one or more banking institutions for the dispensing operation, separate from the networks and protocols currently existing for card facilitated payments.

The invention therefore envisages the implementation of a series of management modules that set up the communication network required for the final payment order operating capability via SMS, without the need for funds to be transferred.

The scope of application of the invention lies within the industrial sector of telecommunications in general and, more specifically, in the sphere of banking transactions, especially in the area of the management of the services available by means of automatic telling machines.

BACKGROUND AND SUMMARY OF THE INVENTION

The taking out or withdrawal of sums of cash by way of an automatic telling machine of the type placed at the disposal of clients by the different banking institutions is a very widely used resource nowadays and has now become an essential service for many users, this type of service usually being linked to the use of a card, pass book or some other instrument of payment facilitated for its management and execution by way of operations of this type.

Today these transactions effected at cash dispensers are protected by the use of a personal PIN known by the holder of the card that permits or makes him eligible to be able to execute the operations and transactions offered by the machine that the requester deems fit, the holder of the account or instrument of payment or another user who knows the PIN and is in possession of the instrument of payment, being the only ones who can operate at the cash dispenser.

Furthermore, payment transactions to third parties may also be carried out by means of bank transfers, in which case a certain operating capability is required involving two bank accounts, namely a source and a destination account, as otherwise the use of credit cards for transactions of this type would require the personal attention of its holder or, as the case may be, entrust the personal card and its PIN to a third party to perform the transaction, which could possibly create a situation of absence of security.

Patent document GB-2 379 525 describes a method and an appliance for authorizing electronic payments to third parties by means of the transfer of funds between banking institutions, therefore requiring two bank accounts, namely the source and the destination account. For their part, the documents of Japanese Patents nos. JP-11 039 538 and JP-2003 123 126 describe devices and methods for the execution of automatic transactions, based in both cases on the use of a personal PIN personal (the holder's) to execute the order, therefore only allowing the cash amount to be withdrawn from his own account. Similarly, international patent PCT n° WO 00/22494 refers to a system and a method for the execution of financial transactions, in which a principal has to make prior payment of the cash amount to be transferred, so the recipient must have a physical instrument for recovery of the money.

Furthermore, document US 2002069170 presents a method in which a principal may permit a beneficiary to draw on funds in an automatic telling machine without the need for a card. For this purpose it will be necessary for the beneficiary to enter into the ATM a given code or PIN which he has been previously informed of by the principal. The communication of the code to the principal involves problems of security that make its use unfeasible in the banking field and in operations with a plurality of beneficiaries.

All the drawbacks described above are remedied in the present invention, with the result that significant improvements are achieved in relation to what is known and used at the present time.

Taking into consideration the present situation inherent in operations of the type mentioned, the invention has proposed as its main objective the fact of developing a method by means of which it may prove possible to simplify everything required to execute the operations or payments to third parties other than the holders in a secure fashion, so that these operations may be carried out simply and remotely without the third party having to be the holder of an account or instrument of payment of any kind.

The idea is focused around the use of the mobile telephone, whereby a method of payment to a third party is achieved quickly and efficiently in such a way that the latter does not have to be in possession of any type of account or instrument of payment, it merely being necessary to make use of a mobile telephone which will make it possible to know the data via SMS for a subsequent withdrawal of cash by this third party, without any kind of card or the like. The operation considered will naturally be subject to the issuer's eligibility and authorization first of all and then to the entry of a personal PIN, which is linked to the operation and which will be different for every one of the operations at the cash dispenser where the actual payment has to be made.

SHORT DESCRIPTION OF THE DRAWINGS

These and other features and advantages of the invention will be explained more clearly on the basis of the following more detailed description of a preferred form of embodiment, offered merely as a non-restrictive example, with reference to the accompanying drawings, in which:

FIG. 1 represents a block diagram which serves the purpose of offering a general layout of the system or succession of actions proposed by the invention for the final withdrawal of the sum of cash at a teller machine through the use of a mobile telephone and by means of transmission via SMS, and FIG. 2 shows schematically by means of a block diagram a layout of the same type as shown in the previous Figure, referring to the method known in practice as "clearing" relating to such operations as the settlement by means of electronic clearing of fees, operating expenses, charges, etc.

DESCRIPTION OF A PREFERRED FORM OF EMBODIMENT

As stated above, the detailed description of the invention is going to be given taking into consideration the representations in the adjoining drawings by means of which the same numerical references are used to designate the same or similar parts. In this respect, FIG. 1 shows an example of the invention system in relation to the actions followed for the execution of a transaction of the type proposed, by means of a mobile telephone and with the use of an SMS message through which a previous order is enabled or cancelled, with a view to a third party being in a position to withdraw a given amount of cash, determined by the principal of the operation, at any cash dispenser that is enabled for operations of this type, without the need to use an instrument of payment whatsoever and without the need to execute any operation of transfer of funds in the course of the transaction.

More specifically, the system proposed by the invention is set up so that the whole process associated with the operations proposed may be carried out with same, said process consisting of a first phase, identified in the figure with the label 1a, corresponding to a stage of the process in which the principal of the operation, identified in the figure with the numerical reference 2, uses a computer, a mobile telephone or a cash dispenser to request the acceptance/cancellation of an operation of this type from an issuing entity, indicated in the figure with reference 3, followed by a second stage 2b in which the issuing entity 3 communicates the operation acceptance/cancellation order on-line to a central unit or national ATMPAY module, numbered with 4 in the drawing, where acceptance/cancellation of the payment order is received from the issuing entity 3 and stored, keeping a record of all this in the data base, identified in the drawing with numerical reference 5.

After the appropriate formalities, at a third stage 1c, the principal 2 is informed by means of an SMS message at the mobile telephone or at a computer of confirmation of the acceptance/cancellation of the operation and authorization of payment in the event of acceptance of the service; otherwise, i.e. for the cancellation of the service, an automatic cancellation procedure is necessary to stop the payment order. Then, continuing with the process and at a stage identified in the figure with reference 1d, the beneficiary 6 receives an SMS message at the mobile telephone in which the different aspects of the operation are specified, such as any reference number, the amount and particulars of the principal 2, besides a code or PIN of an individual nature for each operation of this type, this stage being shown in the figure with reference 1d.

When the beneficiary 6 is aware of the operation identifying details, at stage 1e, the beneficiary makes a request for cash at an ATM enabled for the purpose, referenced in the figure with number 7, where, after entering the PIN designated for this particular transaction, in which the ATMPAY node holds the cryptographic codes of the banks in safekeeping, the cash dispenser 7 submits an authorization/correction request, stage 1f, to the acquiring entities, recognized in the drawing by means of block 8.

At stage 1g the acquiring entities 8 undertake the authorization/correction request to the national ATMPAY module 4, where authorization/denial of the order to process is supplied to the acquiring entities 8, a stage shown in the figure with reference 1h. Then, at stage 1i, the acquiring entities grant authorization/denial to the cash dispenser 7, while the delivery/denial of cash to the beneficiary 6 is carried out at a stage 1j.

Lastly, the national ATMPAY module, recognized in the figure at stage 1k, communicates payment to the issuing entity 3 by means of an off-line communication.

The above-described method has been developed on a national basis, but this should not be considered as being restrictive as the system could be applied worldwide by means of communication or processing between the national ATMPAY module 4 and an equivalent international ATMPAY module, which appears in the figure referenced as number 9. In any case, the essence of the invention remains intact, since in no way is it necessary to transfer funds from one entity to another, which would entail, as we know, the need for the beneficiary 6 to have an account or instrument of payment and which is not necessary in the case of the invention.

FIG. 2 offers an overall view of the method known by the name of "clearing", in which the relevant actions are handled after an operation of the type mentioned above, where the electronic inter-bank clearing of fees, operating expenses and charges generated in the operation is carried out.

FIG. 2 shows in greater detail in a series of stages the method followed, in which at an initial stage 10a, the relevant orders for payment of fees, operating expenses and charges for the operation are submitted by the acquiring entities 8 to the national ATMPAY module 4, which carries out, at stage 10b, the submission by lots of payment orders, operating expenses and charges to the issuing entities 3, effecting the relevant settlement and collections of charges from the principal 2, at the stage identified in the figure with reference 10c.

After the afore-mentioned stages, the acquiring entities 8 proceed to effect the corresponding settlement at the cash dispenser used 7, at a stage recognized as 10d. Then comes a stage 10e, at which the relevant transaction with the national electronic clearing system, numbered 12, takes place by way of a liquidating entity, referenced in the figure with number 11.

Finally, at stages 10f and 10g the relevant pay-backs are effected between the issuing entities 3 and the acquiring entities 8 by way of the national ATMPAY module 4.

It is not considered necessary to make the contents of this description more extensive for an expert on the matter to be able to appreciate its scope and the advantages stemming from the invention, as well as to develop and put the object of same into practice.

However, it should be realised that the invention has been described according to a preferred embodiment of same, so it may be open to modifications without this entailing an alteration of the scope thereof.

The invention claimed is:

1. A method for facilitating a funds transaction from a principal having an association with an issuing entity to a beneficiary at an automatic fund dispenser of an acquiring entity, comprising the steps of:
   a. receiving, by a computer comprising an issuing entity server, an electronically communicated funds transaction request requesting for funds to be transferred from the principal to the beneficiary the beneficiary holding an account or card of neither the issuing entity nor the acquiring entity, and where the issuing entity and the acquiring entity belong to different banking institutions;
   b. electronically communicating, from the computer comprising the issuing entity server to a computer comprising a central server belonging to neither the issuing entity nor the acquiring entity, said funds transaction request;
   c. electronically communicating, from the computer comprising the central server to a beneficiary's communication device, identification particulars of the funds transaction initiated by the principal, including an amount of the funds transaction and a code associated with said funds transaction, said code being generated by the computer comprising the central server and being unknown to the principal;
   d. upon a request of the funds transaction by the beneficiary, which is carried out using said code at the automatic funds dispenser of the acquiring entity, electronically sending an authorization request from said automatic funds dispenser of the acquiring entity to the computer comprising the acquiring entity server;

e. electronically requesting, from the computer comprising the acquiring entity server to the computer comprising the central server, authorization for performing the funds transaction;

f. upon receiving, from the computer comprising the central server, an authorization or denial for performing the funds transaction, electronically sending, from the computer comprising the acquiring entity server to the automatic funds dispenser of the acquiring entity, said authorization or denial for performing the funds transaction; and g. concluding the funds transaction at the automatic fund dispenser of the acquiring entity based upon said authorization or denial.

2. The method as in claim 1, further comprising clearing of the funds transaction, comprising the steps of:

i. electronic submission, from the computer comprising the acquiring entity server to the computer comprising the central server, of charges due to the concluded funds transaction;

j. electronic communication, from the computer comprising the central server to the computer comprising the issuing entity server, of said charges due to the concluded funds transaction;

k. effecting collection, by the computer comprising the issuing entity server from the principal's account, of said charges due to the concluded funds transaction; and l. electronically effecting settlement of said charges from the computer comprising the issuing entity server to the computer comprising the acquiring entity server through a computer comprising a settlement entity server belonging to neither the issuing entity nor the acquiring entity.

3. The method as in claim 1, wherein the electronic communication between the principal's communication device and the computer comprising the issuing entity server, and between the computer comprising the central server and the beneficiary's communication device, is via a mobile phone.

4. The method as in claim 3, wherein the communication via mobile phone comprises text messages.

5. The method as in claim 1, wherein the funds transaction is a withdrawal of cash.

6. The method as in claim 1, wherein the automatic funds dispenser is an ATM machine.

7. The method as in claim 1, where the computer comprising the central server is a computer comprising a national central server.

8. The method as in claim 7, further comprising a step of electronic communication between said computer comprising the national central server and a computer comprising an international central server belonging to neither the issuing entity nor the acquiring entity, in case the issuing entity and the acquiring entity were located in different countries.

9. A system for facilitating a funds transaction from a principal having an association with an issuing entity to a beneficiary at an automatic fund dispenser of an acquiring entity, comprising:

a) a computer comprising an issuing entity server for receiving, from a principal, an electronically communicated funds transaction request to a beneficiary the beneficiary not holding an account or card of neither the issuing entity nor the acquiring entity, and where the issuing entity and the acquiring entity belong to different banking institutions;

b) a computer comprising a central server belonging to neither to the issuing entity nor the acquiring entity, which is capable of electronically communicating to the beneficiary's communication device identification particulars of the funds transaction initiated by the principal, including the amount of the funds transaction and a code associated with said funds transaction, said codes being generated by the computer comprising the central server and being unknown to the principal; and c) a computer comprising an acquiring entity server, which is associated with an automatic funds dispenser of the acquiring entity receiving a request, by the beneficiary and using said code, for carrying out the funds transaction, said computer comprising the acquiring entity server being capable of electronically receiving an authorization or denial from the computer comprising the central server in response to electronically forwarding of the code to the computer comprising the central server, and also of electronically sending to the automatic funds dispenser of the acquiring entity said authorization or denial for action thereon by the beneficiary.

10. The system of claim 9, the system further providing clearing of the funds transaction, wherein:

the computer comprising the acquiring entity server is capable of electronic submission, to the computer comprising the central server, of charges due to the concluded funds transaction;

the computer comprising the central server is capable of electronic communication, to the computer comprising the issuing entity server, of said charges due to the concluded funds transaction;

the computer comprising the issuing entity server is capable of effecting collection, from the principal's account, of said charges due to the concluded funds transaction; and further comprising:

a computer comprising a settlement entity server belonging to neither the issuing entity nor the acquiring entity, for effecting electronically settlement of said charges from the computer comprising the issuing entity server to the computer comprising the acquiring entity server.

11. The system of claim 9, wherein the electronic communication between the principal's communication device and the computer comprising the issuing entity server, and between the computer comprising the central server and the beneficiary's communication device, is via a mobile phone.

12. The system of claim 11, wherein the communication via mobile phone comprises text messages.

13. The system of claim 9, wherein the funds transaction is a withdrawal of cash.

14. The system of claim 9, wherein the automatic funds dispenser is an ATM machine.

15. The system of claim 9, wherein the computer comprising the central server is a computer comprising a national central server.

16. The system of claim 15, further comprising a computer comprising an international central server belonging to neither the issuing entity nor the acquiring entity, which is capable of electronic communication with the computer comprising the national central server in case the issuing entity and the acquiring entity were located in different countries.

\* \* \* \* \*